United States Patent Office 3,842,090
Patented Oct. 15, 1974

3,842,090
CERTAIN 1-AMINOMETHYL-6-PHENYL 4H-s-TRIAZOLO[4,3-a][1,4]BENZODIAZEPINES
Martin Gall, Kalamazoo, and Jackson B. Hester, Jr., Galesburg, Mich., assignors to The Upjohn Company, Kalamazoo, Mich.
No Drawing. Filed Feb. 14, 1973, Ser. No. 332,293
Int. Cl. C07d 57/02, 99/02
U.S. Cl. 260—247.1
11 Claims

ABSTRACT OF THE DISCLOSURE

A multi-step process for the preparation of 1-[amino-(or 1-substituted amino)methyl]-6-phenyl-4H-s-triazolo-[4,3-a][1,4]benzodiazepines of the formula X

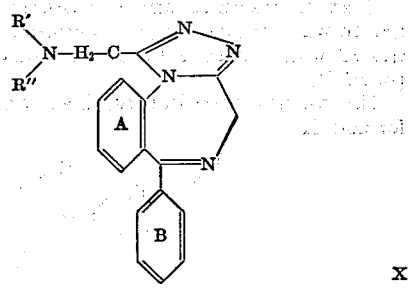

X wherein R' and R" are selected from the group consisting of hydrogen, alkyl of 1 to 3 carbon atoms, inclusive, or together

is pyrrolidino, piperidino, morpholino, 4-methyl-, or 4-phenylpiperazino, and wherein the rings A and B are unsubstituted or substituted by one or two substituents selected from the group consisting of halogen, nitro, cyano, trifluoromethyl, and alkyl, alkoxy, alkylthio, alkylsulfinyl, alkylsulfonyl, alkanoylamino, dialkylamino in which the alkyl moiety is of 1 to 3 carbon atoms, are prepared from the selected 2-[3-(hydroxymethyl)-4H-1,2,4-triazol-4-yl] benzophenone. The resulting final, known products above are useful tranquilizing compounds having at the same time anti-depressant activity.

BACKGROUND OF THE INVENTION

Field of the invention

This invention is directed to a new process for organic compounds and is particularly concerned with a process for 1-[amino(or 1-substituted amino)methyl]-6-phenyl-4H-s-triazolo[4,3-a][1,4]benzodiazepines.

The process of production therefor can be illustratively represented as follows:

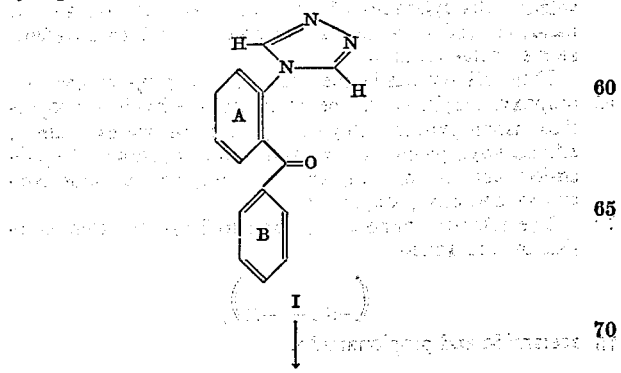

I

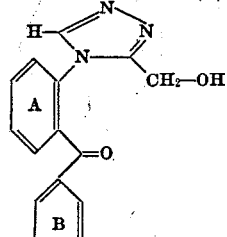

II

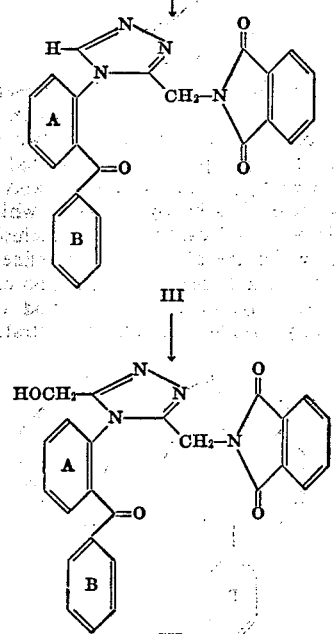

III

IV

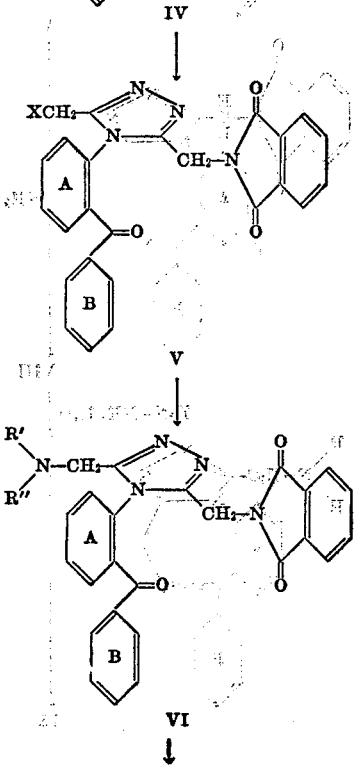

V

VI

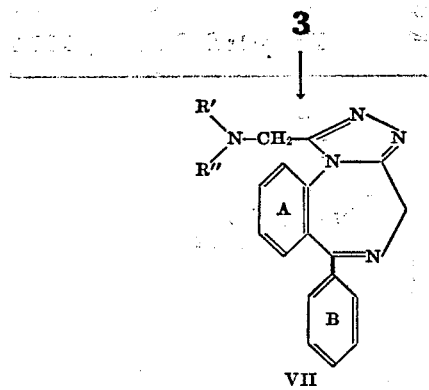

VII wherein X is chloro or bromo; wherein R' is hydrogen or alkyl of 1 to 3 carbon atoms, inclusive; wherein R'' is alkyl of 1 to 3 carbon atoms, inclusive, or, together

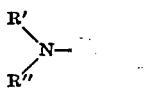

is pyrrolidino, piperidino, morpholino, 4-methyl-, or 4-phenylpiperazino, and wherein the rings A and B are unsubstituted or substituted by one or two substituents selected from the group consisting of halogen, nitro, cyano, trifluoromethyl, and alkyl, alkoxy, alkylthio, alkylsulfinyl, alkylsulfonyl, alkanoylamino in which the carbon moiety is of 1 to 3 carbon atoms, inclusive, and dialkylamino in which the alkyl group is defined as above.

In the event that a 1-unsubstituted amino compound is wanted (R'=R''=hydrogen), the method of synthesis has to be slightly modified. It can be illustratively shown as follows:

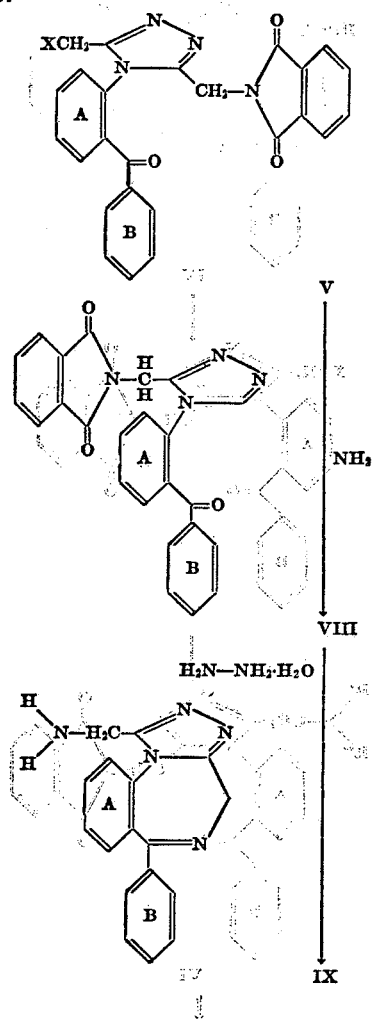

wherein the designation X, A and B have the same significance as hereinabove.

The process of this invention comprises:

1. treating a compound of formula I with formaldehyde at 100–150° C. to obtain the compound of formula II;
2. treating II with phthalimide, triphenylphosphine and diethyl azodicarboxylate between 2–36 hours at 0 to 40° C. to obtain the corresponding compound of formula III;
3. treating III with formaldehyde at 100–150° C. to obtain a compound of formula IV;
4. treating IV with a halogenating agent selected from thionyl chloride or phosphorus tribromide to obtain the product V;
5. treating V with a primary or secondary amine selected from monoalkyl- or dialkylamine, pyrrolidine, piperidine, 4-methyl- and 4-phenylpiperazine, and morpholine to obtain the corresponding compound VI and
6. treating VI with hydrazine to obtain the compound VII.

If an unsubstituted amine is desired compound V is treated with ammonia to give compound VIII and VIII is treated with hydrazine to give the 1-aminomethyl compound IX.

The method therefore furnishes compounds of the formula X

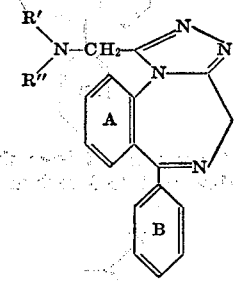

X wherein R' and R'' are selected from the group consisting of hydrogen, alkyl of 1 to 3 carbon atoms, inclusive, or together

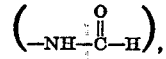

is pyrrolidino, piperidino, morpholino, 4-methyl-, or 4-phenylpiperazino; and wherein the rings A and B are unsubstituted or substituted by one or two substituents selected from the group consisting of halogen, nitro, cyano, trifluoromethyl, and alkyl, alkoxy, alkylthio, alkylsulfinyl, alkylsulfonyl, alkanoylamino, in which the carbon moiety is of 1 to 3 carbon atoms, inclusive, and dialkylamino in which the alkyl moiety is of 1 to 3 carbon atoms.

DESCRIPTION OF THE PREFERRED EMBODIMENT

Lower alkyl groups of 1 to 3 carbon atoms, inclusive, are exemplified by methyl, ethyl, propyl, and isopropyl.

The carbon chain moiety of alkoxy, alkylthio, alkylsulfinyl, dialkylamino which is of 1 to 3 carbon atoms, inclusive, and is defined as lower-alkyl of 1 to 3 carbon atoms, inclusive, above.

Thus, alkoxy can be methoxy, ethoxy, propoxy and isopropoxy; alkylthio can be methylthio, ethylthio, propylthio, isopropylthio; alkylsulfinyl can be methylsulfinyl, ethylsulfinyl, propylsulfinyl, and isopropylsulfinyl; dialkylamino can be dimethylamino, diethylamino, dipropylamino, and diisopropylamino.

The alkanoylamino groups of 1 to 3 carbon atoms consists of formamido $$\left(-NH-\overset{O}{\underset{\|}{C}}-H\right),$$

acetamido and propionamido.

The compounds of the formulae VII and IX including acid addition salts thereof have sedative, tranquilizing and anti-depressant effects in mammals, including man and birds.

Sedative effects of e.g. 8-chloro-1-[(dimethylamino)-methyl]-6-phenyl - 4H - s - triazolo[4,3-a][1,4]benzodiazepine are shown by the following tests in mice:

Chimney test

[Med. Exp. 4, 145 (1961)]: The effective intraperitoneal dosage for 50% of mice ($ED_{50}$) is 2.3 mg./kg. The test determines the ability of mice to back up and out of a vertical glass cylinder within 30 seconds. At the effective dosage, 50% of the mice failed doing it.

Dish test

Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 0.28 mg./kg.

Pedestal test

The untreated mouse leaves the pedestal in less than a minute to climb back to the floor of the standard mouse box. Tranquilized mice will stay on the pedestal for more than 1 minute. The $ED_{50}$ (intraperitoneal administration) is 0.8 mg./kg.

Nicotine antagonism test

Mice in a group of 6 are injected with the test compound, 8-chloro-1-[(dimethylamino)methyl] - 6 - phenyl-4H-s-triazolo[4,3-a][1,4]benzodiazepine. Thirty minutes later the mice including control (untreated) mice are injected with nicotine salicylate (2 mg./kg.). The control mice show overstimulation, i.e., (1) running convulsions (2) tonic extensor fits; followed by (3) death. An intraperitoneal dosage of .11 mg./kg. of the test compound protected 50% of the animals against (3).

Antagonism to strychnine (as sulfate)

The effective dosage $ED_{50}$ of 8-chloro-1-[(dimethylamino)methyl]-6-phenyl-4H - s - triazolo[4,3-a][1,4]benzodiazepine is 50 mg./kg. orally in mice. The test consists in orally administering into groups of 6 mice the test compound, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice. The following compounds have (by intraperitoneal injection) $ED_{50}$ values as shown in the table I below.

TABLE I

| Compound | $ED_{50}$ (in mg./kg.) | | | |
|---|---|---|---|---|
| | Ch | D | P | Ni |
| 8-chloro-1-[(dimethylamino)methyl]-6-(o-chlorophenyl)-4H-s-triazolo[4,3-a][1,4]benzodiazepine | 0.2 | 0.36 | 0.36 | 0.63 |
| 1-[(dimethylamino)methyl]-6-(o-chlorophenyl)-4H-s-triazolo[4,3-a][1,4]benzodiazepine | 0.35 | 0.8 | 22 | 0.15 |
| 8-chloro-1-[(diethylamino)methyl]-6-(o-chlorophenyl)-4H-s-triazolo[4,3-a][1,4]benzodiazepine | 0.63 | 0.11 | 0.4 | 0.08 |

The novel compounds of formula X and pharmacologically acceptable acid addition salts and N-oxides thereof have antidepressant activity and are thus useful for the treatment of depression in mammals or birds.

The main function of an anti-depressant is to return the depressed individual to normal functioning. This should be carefully differentiated from psychic stimulants such as the amphetamines which produce overstimulation in the normal individual.

Many different methods have been and are used to evaluate antidepressant activity. In general these methods involve antagonism to a depressant such as reserpine or tetrabenazine or a synergistic increase of the toxicity of certain compounds (i.e. yohimbine or 3,4-dihydroxyphenylalanine and comparison of the drug action of the new compound with other known antidepressants. No single test alone can determine whether or not a new compound is an antidepressant or not, but the profile evidenced by various tests will establish the anti-depressant action if present. A number of such tests are described below.

Hypothermic tests with oxotremorine: [1-(4-pyrrolidino-2-butynyl)-2-pyrrolidinone].

Oxotremorine (as well as apomorphine and tetrabenazine) produces hypothermic responses in mice. This response is blocked by anticholinergics and anti-depressants such as atropine and imipramine respectively.

Oxotremorine produces a very pronounced hypothermia.

At a dose of 0.6 mg./kg. the body temperature of a mouse is decreased about 13° F. (when the mouse is kept at room temperature). This temperature decrease is antagonized by anti-depressants e.g. desipramine, imipramine, doxepine, and others, as can be seen from Table II.

TABLE II

| | Dose mg./kg., i.p. | Absorption time (min.) | Body temperature, ° F., change from vehicle control after— | | | |
|---|---|---|---|---|---|---|
| | | | 15 mins. | 30 mins. | 60 mins. | 90 mins. |
| Oxotremorine (control) | 0.6 | | −5.8 | −11.6 | −13.2 | −8.0 |
| Desipramine | 25 | 30 | −3.5 | −3.5 | −4.1 | −3.6 |
| Imipramine | 25 | 30 | −0.4 | −3.3 | −5.6 | −6.4 |
| Iprindole | 25 | 30 | −6.3 | −11.8 | −12.8 | −11.9 |
| Doxepine | 25 | 30 | −2.3 | −7.1 | −11.0 | −12.3 |
| Amitriptyline | 25 | 30 | +0.7 | −2.4 | −5.4 | −6.8 |
| Amphetamine | 5 | 30 | −1.5 | −4.3 | −4.4 | −2.2 |
| Atropine | 3 | 30 | +0.6 | −0.6 | −0.7 | −0.2 |

The present compounds were tested as follows. Four male mice of 18–22 g. (Strain CF=Carworth Farms) were injected intraperitoneally with 1 mg. of oxotremorine. The lowering of the body temperature was measured rectally with an electronic thermometer, before and 30 minutes after drug administration. After the drug administration the mice were kept at 19° C. in cages. A four degree difference between the control mice (oxotremorine alone) and the treated mice (oxotremorine and test compound) was used to indicate the antagonistic action of the test compound.

The test results are tabulated below:

The $ED_{50}$ is the dosage of the test compound at which half the mice had a temperature of at least 4° C. higher than the control mice.

TABLE III

| Compounds: | $ED_{50}$ (mg./kg.) |
|---|---|
| 8-chloro-1 - [(dimethylamino)methyl] - 6 - phenyl - 4H - s - triazolo[4,3][2,4] benzodiazepine | 5.3 |
| 8-chloro - 1 - [(diethylamino)methyl] - 6-phenyl-4H - s - triazolo[4,3 - a][1,4]benzodiazepine | 50 |
| Iprindole | >50 |
| Imipramine | 5.3 |
| Doxepine | 14.9 |

Potentiation of yohimbine aggregation toxicity: the $LD_{50}$ of yohimbine hydrochloride in mice is 45 mg./kg. i.p. Administration of 30 mg./kg. of yohimbine hydrochloride was non-lethal. If an antidepressant is administered prior to the yohimbine hydrochloride (30 mg.) the lethality of the yohimbine hydrochloride is increased.

Ten male CF mice, 18–22 g., were injected with the anti-depressant and 30 minutes later with 30 mg. of yohimbine hydrochloride (YCl) in saline solution. After two hours, the $LD_{50}$ are determined. No mice or only one mouse is killed by 30 mg. of (YCl). If (YCl) is administered in the presence of an anti-depressant an increase of the toxicity of (YCl) is observed. The $ED_{50}$ values of the new compound and standard medicament which causes 50% of the mice to die is shown in Table IV.

TABLE IV

| | $ED_{50}$(mg./kg.) |
|---|---|
| [YCl] (30 mg.) control | (¹) |
| [YCl] and 8-chloro - 1 - [dimethylamino)methyl]-6-phenyl - 4H - s-triazolo[4,3-a][1,4]benzodiazepine | 12.5 |
| [YCl] and 8 - chloro - 1 - [(diethylamino)methyl]-6 - phenyl - 4H - s - triazolo[4,3-a][1,4]benzodiazepine | 42 |
| [YCl] and Iprindole | 20 |
| [YCl] and Imipramine | 4.4 |
| [YCl] Doxepine | 17.7 |

¹ No deaths.

*Potentiation of apomorphine gnawing*

A group of 4 mice (male, CF, 18–22 g.) are administered the test compound intraperitoneally one hour prior to the subcutaneous injection of apomorphine hydrochloride 10 mg./kg. The mice are then placed in a plastic box (6" x 11" x 5") lined at the bottom with a cellophane-backed, absorbent paper. The degree of damage to the paper at the end of 30 min. is scored from zero to 4. The scores 3 and 4 indicate that the compound is a potentiator of apomorphine in this test ($ED_{50}$). The results are in Table V.

TABLE V

| Compound: | $ED_{30}$ (mg./kg.) |
|---|---|
| 8 - chloro - 1 - [(dimethylamino)methyl] - 6-phenyl - 4H-s-triazolo[4,3 - a][1,4]benzodiazepine | 5.3 |
| 8 - chloro - 1 - [(diethylamino)methyl]-6-phenyl - 4H-s-triazolo[4,3 - a][1,4] benzodiazepine | 14.9 |
| Iprindole | >50 |
| Imipramine | 17.7 |
| Doxepine | 17.7 |

The $LD_{50}$ values in mice for these compounds are listed in table VI.

TABLE VI

| Compound: | $LD_{50}$ (mg./kg.) |
|---|---|
| 8 - chloro - 1 - [(dimethylamino)methyl]-6-phenyl-4H - s - triazolo[4,3-a][1,4]benzodiazepine | 476 |
| 8 - chloro - 1 - [(diethylamino)methyl]-6-phenyl - 4H - s - triazolo[4,3-a][1,4]benzodiazepine | >100 |
| Iprindole | 450 |
| Imipramine | 178 |
| Doxepin | 126 |

The $ED_{50}$ and $LD_{50}$ of the new compounds compare thus favorably with standard antidepressant compounds on the market.

Other compounds of formula IV are anti-depressants as shown by table VII:

TABLE VII

| | YO | Oxo | Ap | $LD_5$ |
|---|---|---|---|---|
| 8-chloro-1-(aminomethyl)-6-phenyl-4H-s-triazolo[4,3-a][1,4]benzodiazepine | 35.4 | 29.7 | 2.6 | >100 |
| 8-chloro-1-[(dimethylamino)methyl]-6-(o-chlorophenyl)-4H-s-triazolo[4,3-a][1,4]benzodiazepine | >30 | >30 | 17.8 | >100 |
| 1-[(dimethylamino)methyl]-6-(o-chlorophenyl)-4H-s-triazolo[4,3-a][1,4]benzodiazepine | >30 | >30 | >30 | >100 |

NOTE.—YO = Yohimbine test, Oxo = Oxotremorine test, Ap = Apomorphine test.

The pharmaceutical forms contemplated by this invention include pharmaceutical compositions suited for oral, parenteral, and rectal use, e.g., tablets, powder packets, cachets, dragees, capsules, solutions, suspension, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Water or oils, e.g., coconut oil, sesame oil, safflower oil, cottonseed oil, peanut oil may be used for preparing solutions or suspensions of the active drug. Sweetening, coloring, and flavoring agents may be added.

For mammals and birds, food premixes with starch, oatmeal, dried fishmeat, fishmeal, flour, and the like can be prepared.

As tranquilizers the compounds of formula X can be used in dosages of 0.02 mg. to 1 mg./kg. in oral or injectable preparations, as described above, to alleviate tension and anxiety in mammals, or birds, such as e.g., occurs when animals are in travel.

Other acid addition salts of the compounds of formulae II, III, and IV can be made such as the fluosilicic acid addition salts which are useful mothproofing compounds or the trichloroacetates useful as herbicides against Johnson grass, Bermuda grass, yellow foxtail, and green foxtail, and quack grass.

The starting compounds of this invention can be produced according to the process described by M. E. Derieg et al., J. Heterocyclic Chemistry 8, 181 (1971) or according to the processes shown in U.S. Pat. 3,709,898, issued Jan. 9, 1973.

Starting compounds, thus obtained, include

2',5-dichloro-2-[3-(hydroxymethyl)-4H-1,2,4-triazol-4-yl]benzophenone;

2'-chloro-2-[3-(hydroxymethyl)-4H-1,2,4-triazol-4-yl]benzophenone;

2'-chloro-5-nitro-2-[3-(hydroxymethyl)-4H-1,2,4-triazol-4-yl]benzophenone;

2',6'-difluoro-5-chloro-2-[3-(hydroxymethyl)-4H-1,2,4-triazol-4-yl]benzophenone;

2'-chloro-5-methylthio-2-[3-(hydroxymethyl)-4H-1,2,4-triazol-4-yl]benzophenone;

3,5-dicyano-2'-chloro-2-[3-(hydroxymethyl)-4H-1,2,4-triazol-4-yl]benzophenone;
2',4'-dimethyl-2'-bromo-2-[3-(hydroxymethyl)-4H-1,2,4-triazol-4-yl]benzophenone;
5-bromo-3'-fluoro-2-[3-(hydroxymethyl)-4H-1,2,4-triazol-4-yl]benzophenone;
5-fluoro-4'-methoxy-2-[3-(hydroxymethyl)-4H-1,2,4-triazol-4-yl]benzophenone;
6-methylsulfonyl-4-nitro-2-[3-(hydroxymethyl)-4H-1,2,4-triazol-4-yl]benzophenone;
4-ethylsulfinyl-4-propyl-2-[3-(hydroxymethyl)-4H-1,2,4-triazol-4-yl]benzophenone;
3-diethylamino-3-isopropyl-2-[3-(hydroxymethyl)-4H-1,2,4-triazol-4-yl]benzophenone.
2',4'-di(trifluoromethyl)-2-[3-(hydroxymethyl)-4H-1,2,4-triazol-4-yl]benzophenone;
4'-acetamido-5-propoxy-2-[3-(hydroxymethyl)-4H-1,2,4-triazol-4-yl]benzophenone;
4-ethyl-4'-nitro-2-[3-(hydroxymethyl)-4H-1,2,4-triazol-4-yl]benzophenone;
and the like.

In carrying out the process of this invention comprises treating a selected 2-triazolobenzophenone compound I with formaldehyde at between 100–150° C. for 3–18 hours. The formaldehyde used can either be in an aqueous solution, requiring then a sealed vessel, or can be paraformaldehyde in a high-boiling solvent e.g. toluene, xylenes, ethylbenzene, and the like. The product II, a 2-[3-(hydroxymethyl)-4H-1,2,4-triazol - 4 - yl]benzophenone is recovered and purified by conventional means, such as chromatography and crystallization.

Compound II in an inert organic solvent e.g. tetrahydrofuran is then treated with phthalimide, triphenylphosphine and diethyl azodicarboxylate for 2–36 hours at a temperature of 0 to 40° C. The resulting product III is obtained by concentrating the reaction solution, extraction, chromatography and the like.

Compound III is then treated with formaldehyde or paraformaldehyde as described in the reaction with compound I, to give the corresponding 2-[5-(hydroxymethyl) - 3 - (phthalimidomethyl)-4H-1,2,4-triazol-4-yl]benzophenone IV.

Compound IV is converted to the halomethyl derivative with e.g. thionyl chloride or phosphorus tribromide. The chloro compound IV can, moreover, be converted to the iodo compound in the usual manner i.e. treating the chloro compound with sodium iodide in acetone at 25–56° for 6–8 hours. If thionyl chloride is used, no solvent is required, but if phosphorus tribromide is used, a solvent such as benzene, methylene chloride, chloroform, carbontetrachloride, ethylene dichloride, and the like is usually employed. The reaction with thionyl chloride is preferably performed between 50–79° C. during 1–3 hours, whereas the reaction with phosphorus tribromide is performed at 0–25° C. for 1 to 6 hours. The product V a 2-[5-(halomethyl) - 3 - (phthalimidomethyl)-4H-1,2,4-triazol-4-yl]benzophenone, is recovered and purified by conventional procedures e.g. extraction, chromatography, crystallization, or the like.

The halogenated compounds V are then treated with a primary or secondary amine, e.g. methylamine, ethylamine, dipropylamine, dimethylamine, diethylamine, or a cyclic amine such as pyrrolidine, piperidine morpholine, or 4-methyl- or 4-phenylpiperazine at temperatures between 0–40°, in solvents such as dioxane, ether, tetrahydrofuran, methylene chloride, chloroform, and the like. The reaction is aided by the addition of sodium or potassium iodide. In the preferred embodiment of this invention the reaction is carried out at low temperatures, e.g. 0 to 5° C. for 5 to 20 minutes, and thereafter the reaction mixture is allowed to warm up to room temperatures and kept at this temperature for a period of 2 to 24 hours. The product, VI, is recovered and purified by standard procedures for example extraction, evaporation, chromatography, crystallization or the like.

Compound VI is then warmed with hydrazine in a lower alkanol e.g. methanol, ethanol, 1-propanol, or 2-propanol to give the compound VII. The compounds VII are recovered and purified by conventional methods e.g. extraction, chromatography, crystallization or the like.

If an unsubstituted compound as of formula IX is desired the compound of formula V is treated with ammonia to give compound VIII and VIII is treated with hydrazine to give compound IX.

The following examples are illustrative of the process and products of the present invention but are not to be construed as limiting.

EXAMPLE 1

5-Chloro-2-[3-(hydroxymethyl)-4H-1,2,4-triazol-4-yl]benzophenone

A stirred mixture of 5-chloro-2-(4H-1,2,4-triazol-4-yl) benzophenone [M. E. Derieg, R. I. Fryer and S. S. Hillery, J. Heterocyclic Chem. 8, 181 (1971)] (0.01 mole), paraformaldehyde (0.33 g.) and xylene (100 ml.) was warmed under nitrogen, in a bath maintained at 125° C. for 7 hours. The mixture was then concentrated in vacuo. The residue was chromatographed on silica gel (150 g.) with 3% methanol-97% chloroform,. The product thus obtained was crystallized from ethanol-ethyl acetate to give 5 - chloro - 2 - [3 - (hydroxymethyl) - 4H - 1,2,4 -triazol-4-yl]benzophenone.

EXAMPLE 2

5-Chloro-2-[3-(phthalimidomethyl)-4H-1,2,4-triazol-4-yl]benzophenone

A stirred mixture of 5-chloro-2-[3-(hydroxymethyl)-4H-1,2,4-triazol-4-yl]benzophenone (0.002 mole), phthalimide (0.324 g., 0.0022 mole), triphenylphosphine (0.576 g., 0.0022 mole) and dry tetrahydrofuran (20 ml.), under nitrogen, was treated with diethyl azodicarboxylate (0.383 g., 0.0022 mole) and stirred at ambient temperature for 23 hours. It was concentrated in vacuo and the residue was chromatographed on silica gel (75 g.) with 1.5% methanol 98.5% chloroform; 10 ml. fractions were collected. The product was crystallized from ethanol-ethyl acetate to give 5-chloro-2-[3-(phthalimidomethyl)-4H-1,2 4-triazol-4-yl]benzophenone.

Alternatively, 5-chloro-2-[3-(phthalimidomethyl)-4H-1,2,4-triazol-4-yl]benzophenone can be prepared by the method of Example 3.

EXAMPLE 3

5-Chloro-2-[3-(phthalimidomethyl)-4H-1,2,4-triazol-4-yl]benzophenone

A solution of 1.00 mmol. of 5-chloro-2-[3-(hydroxymethyl)-4H-1,2,4-triazol-4-yl]benzophenone in 5.0 ml. of methylene chloride was cooled to 0° in an ice bath. Triethylamine (0.150 g., 1.5 mmol.) was added and the solution was stirred for 5 minutes at 0°. Cautiously, and dropwise over 4 min., 0.106 ml. (1.3 mmol.) of methanesulfonyl chloride was added and the solution was stirred for 20 minutes. The reaction was quenched on ice and extracted with a saturated aqueous sodium bicarbonate solution, dried (sodium sulfate) and concentrated in vacuo. The resulting oil, dissolved in 4.0 ml. of freshly distilled tetrahydrofuran was treated at 0° with 0.332 g. (2.0 mmol.) of potassium iodide followed by 0.37 g. (2.0 mmol.) of potassium phthalimide. The mixture was stirred at 0° for 10 minutes then warmed to room temperature and stirred overnight. The mixture was quenched in an aqueous 5% sodium hydroxide solution and the product was extracted with chloroform. The chloroform layer was dried (sodium sulfate) and concentrated in vacuo to yield 5 - chloro - 2 - [3 - (phthalimidomethyl) - 4H - 1,2,4 - triazol-4-yl]benzophenone.

EXAMPLE 4

5-Chloro-2-[5-(hydroxymethyl)-3-(phthalimidomethyl)-4H-1,2,4-triazol-4-yl]benzophenone A stirred mixture of 5-chloro-2-[3-(phthalimidomethyl)-4H-1,2,4 - triazol - 4 - yl]benzophenone, (0.01 mole) paraformaldehyde (3 g.) and xylene (100 ml.) was warmed under nitrogen, in a bath maintained at 125° C. for 7 hours. The mixture was then concentrated in vacuo. The residue was chromatographed on silica gel (150 g.) with 3% methanol-97% chloroform. The product thus obtained was crystallized from ethanol-ethyl acetate to give 5 - chloro - 2 - [5 - (hydroxymethyl) - 3 - (phthalimidomethyl)-4H-1,2,4-triazol-4-yl]benzophenone.

EXAMPLE 5

5-Chloro-2-[5-(chloromethyl)-3-(phthalimidomethyl)-4H-1,2,4-triazol-4-yl]benzophenone A solution of 5 - chloro - 2 - [5 - (hydroxymethyl) - 3 - (phthalimidomethyl) - 4H - 1,2,4 - triazol - 4 - yl]benzophenone (0.001 mole) in thionyl chloride (2 ml.) was warmed during 40 minutes to a bath temperature of 78° C. and kept at 78–83° C. for 1 hour 25 minutes. It was then cooled and poured into ice water. This mixture was neutralized with sodium bicarbonate and extracted with chloroform. The extract was washed with brine, dried over anhydrous magnesium sulfate and concentrated in vacuo. The residue was crystallized from ethyl acetate-Skellysolve B hexanes to give 5-chloro-2-[5-chloromethyl) - 3 - (phthalimidomethyl) - 4H - 1,2,4 - triazol - 4 - yl]benzophenone.

EXAMPLE 6

5-Chloro-2-[5-(bromomethyl)-3-(phthalimidomethyl)-4H-1,2,4-triazol-4-yl]benzophenone A solution of 5 - chloro - 2 - [5 - (hydroxymethyl) - 3 - (phthalimidomethyl) - 4H - 1,2,4 - triazol - 4 - yl]benzophenone (0.001 mole) in dry, hydrocarbon-stabilized chloroform (5 ml.) was cooled in an ice bath and treated with phosphorus tribromide (0.1 ml.). The colorless solution was kept in the ice bath for 55 minutes and at ambient temperature (22–24° C.) for 5 hours. The resulting yellow solution was poured into a mixture of ice and dilute sodium bicarbonate and this mixture was extracted with chloroform. The extract was washed with brine, dried over anhydrous magnesium sulfate and concentrated. The residue was crystallized from methylene chloride-ethyl acetate to give 5-chloro-2-[5-(bromomethyl)-3-(phthalimidomethyl)-4H-1,2,4-triazol-4-yl]benzophenone.

EXAMPLE 7

5-Chloro-2-[3-(iodomethyl)-5-(phthalimidomethyl)-4H-1,2,4-triazol-4-yl]benzophenone 5 - Chloro - 2 - [3 - (chloromethyl) - 5 - (phthalimidomethyl-4H-1,2,4-triazol-4-yl]benzophenone (0.001 mole) was added to a stirred solution of sodium iodide (300 mg., 0.002 mole) in acetone, and the resulting mixture was stirred at ambient temperature for 7 hours and poured into ice water. This mixture was extracted with chloroform. The extract was washed with brine, dried and concentrated. The residue was crystallized from methylene chloride-ethyl acetate to give 5-chloro-2-[3-(iodomethyl)-5 - (phthalimidomethyl) - 4H - 1,2,4 - triazol - 4 - yl]benzophenone.

EXAMPLE 8

5-Chloro-2-[5-(dimethylamino)methyl-3-(phthalimidomethyl)-4H-1,2,4-triazol-4-yl]benzophenone A stirred suspension of 5-chloro-2-[5-(chloromethyl)-3 - (phthalimidomethyl)-4H-1,2,4-triazol-4-yl]benzophenone hydrochloride (0.01 mole) in tetrahydrofuran (150 ml.) was cooled in an ice bath and treated with sodium iodide (0.01 mole) and 125 ml. of a solution of dimethylamine in methanol. The mixture was removed from the ice bath, stirred at ambient temperature for 18 hours and concentrated in vacuo. The residue was mixed with water and extracted with methylene chloride. The extract was washed with brine, dried over anhydrous potassium carbonate and concentrated. Crystallization of the residue from ethyl acetate gave 5-chloro-2-[5-(dimethylamino)methyl] - 3-(phthalimidomethyl)-4H-1,2,4-triazolyl-4-yl]benzophenone.

EXAMPLE 9

8-Chloro-1-[(dimethylamino)methyl]-6-phenyl-4H-s-triazolo[4,3-a][1,4]benzodiazepine A stirred mixture of 5-chloro-2-[5-[(dimethylamino)-methyl] - 3-(phthalimidomethyl)-4H-1,2,4-triazolyl-4-yl]benzophenone (0.562 mmole) and absolute ethanol (3 ml.) was treated with hydrazine hydrate (0.05 ml., 1.04 mmol.) and refluxed for 2 hours. The cooled mixture was mixed with water and extracted with chloroform. The extract was washed with brine, dried over anhydrous sodium sulfate and concentrated. The residue was chromatographed in silica gel (42 g.) with 2% methanol-98% chloroform; 10 ml. fractions were collected. The product was crystallized from ethyl acetate to give 8-chloro-1-[(dimethylamino)methyl] - 6 - phenyl - 4H-s-triazolo [4,3-a][1,4]benzodiazepine of melting point 171.5–174.5° C.

EXAMPLE 10

8-Chloro-1-(phthalimidomethyl)-6-phenyl-4H-s-triazolo[4,3-a[1,4]benzodiazepine

A stirred suspension of 5-chloro-2-[3-(bromomethyl)-5 - (phthalimidomethyl) - 4H-1,2,4 - triazol-4-yl]benzophenone (0.001 mole) in tetrahydrofuran (15 ml.) was cooled in an ice bath and treated with a saturated solution of ammonia in methanol (12.5 ml.). The resulting solution was allowed to warm to ambient temperature and stand for 24 hours. It was then concentrated in vacuo. The residue was suspended in water, treated with a little sodium bicarbonate and extracted with methylene chloride. The extract was washed with brine, dried with anhydrous potassium carbonate and concentrated. The residue was crystallized from ethyl acetate to give 8-chloro-1 - (phthalimidomethyl) - 6-phenyl-4H-s-triazolo[4,3-a] [1,4]benzodiazepine.

EXAMPLE 11

8-Chloro-1-(aminomethyl)-6-phenyl-4H-s-triazolo-[4,3-a][1,4]benzodiazepine

A stirred mixture of 8-chloro-1-(phthalimidomethyl)-6-phenyl-4H-s-triazolo[4,3-a][1,4-]benzodiazepine (0.562 mmole) and absolute ethanol (3 ml.) was treated with hydrazine hydrate (0.05 ml., 1.04 mmole) and refluxed for 2 hr. The cooled mixture was mixed with water and extracted with chloroform. The extract was washed with water, dried with anhydrous sodium carbonate and concentrated. The residue was chromatographed on silica gel (42 g.) with 5% methanol-95% chloroform. The product thus obtained was crystallized from methylene chloride-ethyl acetate to give 8-chloro-1-(aminomethyl)-6 - phenyl - 4H-s-triazolo[4,3-a][1,4]benzodiazepine of melting point 167.5–172.5° C.

In a variant of this process a compound of formula I is treated and warmed at 100–150° C. to give 1 2-[3,5-bis(hydroxymethyl) - 4H-1,2,4-triazol-4-yl]benzophenone (XI). Compound XI is then treated with phthalimide, triphenylphosphine and diethyl azodicarboxylate in an inert solvent such as tetrahydrofuran to give 1,2-[3,5-bis (phthalimidomethyl)-4H-1,2,4 - triazol-4-yl]benzophenone (VII) which warmed with hydrazine in an 1- or 2-alkanol of 1 to 3 carbon atoms such as methanol, ethanol or 1- or 2-propanol to give a compound of formula IX.

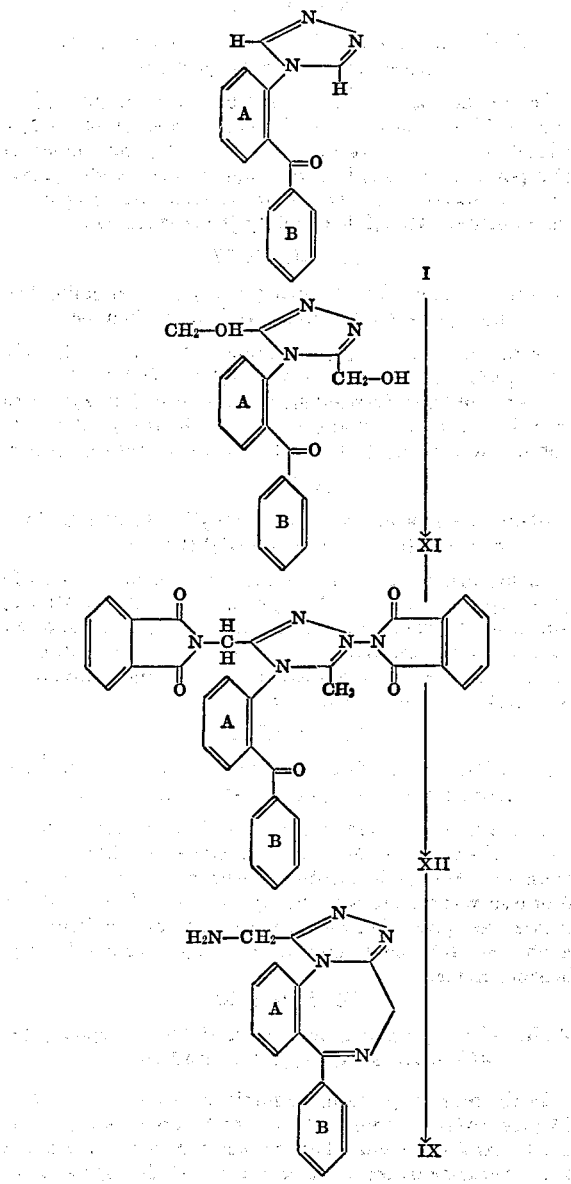

wherein the rings A and B are unsubstituted or substituted by one or two substituents selected from the group consisting of halogen, nitro, cyano, trifluoro-methyl, and alkyl, alkoxy, alkylthio, alkylsulfinyl, alkylsulfonyl, alkanoylamino in which the carbon moiety is of 1 to 3 carbon atoms, inclusive, and dialkylamino in which the alkyl group is defined as above. Example 12 illustrates this procedure.

EXAMPLE 12

8-Chloro-1-(aminomethyl)-6-phenyl-4H-s-triazolo-[4,3-a][1,4]benzodiazepine

A stirred mixture of 5-chloro-2-(4H-1,2,4-triazol-4-yl)benzophenone (0.01 mole), paraformaldehyde (3 g.) and xylene (100 ml.) was warmed, under nitrogen, in an oil bath maintained at 125° C. for 7 hours. The mixture was then concentrated in vacuo. The residue was chromatographed on silica gel (150 g.) with 3% methanol-97% chloroform. The product thus obtained was crystallized from ethanol-ethyl acetate to give 5-chloro-2-[3,5-bis(hydroxymethyl)-4H-1,2,4-triazol-4-yl]benzophenone.

A stirred mixture of 5-chloro-2-[3,5-bis(hydroxymethyl)-4H-1,2,4-triazol-4-yl]benzophenone (0.002 mole), phthalimide (0.648 g., 0.0044 mole), triphenylphosphine (1.152 g., 0.0044 mole) and dry tetrahydrofuran (20 ml.), under nitrogen, was treated with diethyl azodicarboxylate (0.766 g., 0.0044 mole) was stirred at ambient temperature for 23 hours. It was concentrated in vacuo and the residue was chromatographed on silica gel (75 g.) with 1.5% methanol-98.5% chloroform; 10 ml. fractions were collected. The product was crystallized from methanol-ethyl acetate to give 5-chloro-2-[3,5-bis(phthalimidomethyl)-4H-1,2,4-triazol-4-yl]benzophenone.

A stirred mixture of 5-chloro-2-[3,5-bis(phthalimidomethyl)-4H-1,2,4-triazol-4-yl]benzophenone (0.5 mmole) and absolute ethanol (3 ml.) was treated with hydrazine hydrate (0.1 mol.) and refluxed for 2 hours. The cooled mixture was mixed with water and extracted with chloroform. The extract was washed with water, dried with anhydrous sodium carbonate and concentrated. The residue was chromatographed on silica gel (42 g.) with 5% methanol-95% chloroform. The product thus obtained was crystallized from methylene chloride-ethyl acetate to give 8-chloro-1-(aminomethyl)-6-phenyl-4H-s-triazolo[4,3-a][1,4]benzodiazepine of melting point 167.5–172.5° C.

EXAMPLE 13

2',5-Dichloro-2-[3-(hydroxymethyl)-4H-1,2,4-triazol-4-yl]benzophenone

In the manner given in Example 1, 2',5-dichloro-2-[4H-1,2,4-triazol-4-yl]benzophenone was reacted with paraformaldehyde to give 2',5-dichloro-2-[3-(hydroxymethyl)-4H-1,2,4-triazol-4-yl]benzophenone.

EXAMPLE 14

2',5-dichloro-2-[3-(phthalimidomethyl)-4H-1,2,4-triazol-4-yl]benzophenone

In the manner given in Example 2, a mixture of 2',5-dichloro-2-[3-(hydroxymethyl)-4H-1,2,4-triazol-4-yl]benzophenone, phthalimide and triphenylphosphine in tetrahydrofuran was reacted with diethyl azodicarboxylate to give 2',5-dichloro-2-[3-(phthalimidomethyl)-4H-1,2,4-triazol-4-yl]benzophenone.

EXAMPLE 15

2',5-Dichloro-2-[5-(hydroxymethyl)-3-(phthalimidomethyl)-4H-1,2,4-triazol-4-yl)benzophenone In the manner given in Example 4, 2',5-dichloro-2-[3-(phthalimidomethyl)-4H-1,2,4-triazol-4-yl]benzophenone and paraformaldehyde were heated in xylene to give 2',5-dichloro-2-[5-(hydroxymethyl)-3-(phthalimidomethyl)-4H-1,2,4-triazol-4-yl)benzophenone.

EXAMPLE 16

2',5-Dichloro-2-[5-(chloromethyl)-3-(phthalimidomethyl)-4H-1,2,4-triazol-4-yl]benzophenone In the manner given in Example 5, 2',5-dichloro-2-[5-hydroxymethyl)-3-(phthalimidomethyl)-4H-1,2,4-triazol-4-yl]benzophenone was allowed to react with excess thionyl chloride to give 2',5-dichloro-2-[5-(chloromethyl)-3-(phthalimidomethyl)-4H-1,2,4-triazol-4-yl]benzophenone.

EXAMPLE 17

2',5-Dichloro-2-[5-(dimethylamino)methyl-3-(phthalimidomethyl)-4H-1,2,4-triazol-4-yl]benzophenone In the manner given in Example 8, a suspension of 2',5-dichloro[5-(chloromethyl)-3-(phthalimidomethyl)-4H-1,2,4-triazol-4-yl]benzophenone in tetrahydrofuran was treated with dimethylamine and then sodium iodide to give 2',5-dichloro-2-[5-(dimethylamino)methyl-3-(phthalimidomethyl)-4H-1,2,4-triazol-4-yl]benzophenone.

EXAMPLE 18

8-Chloro-1-[(dimethylamino)methyl]-6-(o-chlorophenyl)-4H-s-triazolo[4,3-a][1,4]benzodiazepine In the manner given in Example 9, 2',5-dichloro-2-[5-[(dimethylamino)methyl]-3-(phthalimidomethyl)-

EXAMPLE 33

5-Methylthio - 6 - fluoro-4'-ethylsulfonyl-2-[5 - (hydroxymethyl) - 3 - (phthalimidomethyl) - 4H - 1,2,4 - triazol-4-yl]benzophenone In the manner given in Example 4, 5-methylthio-6-fluoro - 4' - ethylsulfonyl - 2 - [3-(phthalimidomethyl)-4H - 1,2,4 - triazol-4-yl]benzophenone and paraformaldehyde were heated in xylene to give 5-methylthio-6-fluoro-4'-ethylsulfonyl-2-[5-(hydroxymethyl) - 3 - (phthalimidomethyl)-4H-1,2,4-triazol-4-yl]benzophenone.

EXAMPLE 34

5-Methylthio - 6 - fluoro - 4' - ethylsulfonyl-2-[5-(chloromethyl) - 3 - (phthalimidomethyl) - 4H - 1,2,4 - triazol-4-yl]benzophenone In the manner given in Example 5, 5-methylthio-6-fluoro - 4' - ethylsulfonyl - 2 - [5 - (hydroxymethyl)-3-(phthalimidomethyl) - 4H - 1,2,4 - triazol-4-yl]benzophenone was allowed to react with excess thionyl chloride to give 5 - methylthio-6-fluoro-4'-ethylsulfonyl-2-[5-(chloromethyl) - 3 - (phthalimidomethyl)-4H-1,2,4-triazol-4-yl] benzophenone.

EXAMPLE 35

5 - Methylthio - 6 - fluoro - 4' - ethylsulfonyl - 2 - [5-pyrrolidinomethyl) - 3 - (phthalimidomethyl) - 4H - 1,2,4-triazol-4-yl]benzophenone In the manner given in Example 8, a suspension of 5-methylthio - 6 - fluoro-4'-ethylsulfonyl-[5-(chloromethyl)-3-(phthalimidomethyl) - 4H - 1,2,4-triazol - 4 - yl]benzophenone in tetrahydrofuran was treated with pyrrolidine and then sodium iodide to give 5-methylthio-6-fluoro-4'-ethylsulfonyl-2-[5-(pyrrolidinomethyl) - 3 - (phthalimidomethyl)-4H-1,2,4-triazol-4-yl]benzophenone.

EXAMPLE 36

8-Methylthio-7-fluoro-1-(pyrrolidinomethyl) - 6 - (p-ethyl sulfonylphenyl) - 4H - s - triazolo[4,3-a][1,4]benzodiazepine In the manner given in Example 9, 5-methylthio-6-fluoro - 4' - ethylsulfonyl-2-[5-(pyrrolidinomethyl) - 3 - (phthalimidomethyl) - 4H - 1,2,4 - triazol-4-yl]benzophenone was refluxed in methanol with hydrazine hydrate to give 8-methylthio-7-fluoro-1-(pyrrolidinomethyl) - 6 - (p-ethylsulfonylphenyl) - 4H - s - triazolo[4,3-a][1,4]benzodiazepine.

EXAMPLE 37

5-Chloro-2-[5-(piperidinomethyl)-3-(phthalimidomethyl) 4H-1,2,4-triazol-4-yl]benzophenone In the manner given in Example 8, a suspension of 5-chloro - 2 - [5-(chloromethyl) - 3 - (phthalimidomethyl)-4H - 1,2,4 - triazol-4-yl]benzophenone in tetrahydrofuran was treated with piperidine and then sodium iodide to give 5 - chloro - 2 - [5-(piperidinomethyl) - 3 - (phthalimido)-methyl-4H-1,2,4-triazole-4-yl]benzophenone.

EXAMPLE 38

8-Chloro-1-(piperidinomethyl)-6-phenyl-4H-s-triazolo-[4,3-a][1,4]benzodiazepine

In the manner given in Example 9, 5-chloro-2-[5-(piperidinomethyl) - 3 - (phthalimidomethyl)-4H-1,2,4-triazol-4-yl]benzophenone was refluxed in methanol with hydrazine hydrate to give 8 - chloro - 1 - (piperidinomethyl)-6-phenyl-4H-s-triazolo[4,3-a][1,4]benzodiazepine.

EXAMPLE 39

2',5-Dichloro-2-[5-(morpholinomethyl)-3-(phthalimidomethyl)-4H-1,2,4-triazol-4-yl]benzophenone In the manner given in Example 8, a suspension of 2',5-dichloro - 2 - [5-(chloromethyl)-3-(phthalimidomethyl)-4H - 1,2,4 - triazol-4-yl]benzophenone in tetrahydrofuran was treated with morpholine and then sodium iodide to give 2',5-dichloro - 2 - [5-(morpholinomethyl)-3-(phthalimidomethyl)-4H-1,2,4-triazol-4-yl]benzophenone.

EXAMPLE 40

8-Chloro-1-(morpholinomethyl)-6-(o-chlorophenyl)-4H-s-triazolo[4,3-a][1,4]benzodiazepine In the manner given in Example 9, 2',5-dichloro-2-[5-(morpholinomethyl) - 3 - (phthalimidomethyl)-4H-1,2,4-triazol-4-yl]benzophenone was refluxed in 1-propanol with hydrazine hydrate to give 8-chloro-1-(morpholinomethyl)-6-(o-chlorophenyl) - 4H - s - triazolo[4,3-a][1,4]benzodiazepine.

EXAMPLE 41

2',5 - Dichloro - 2 - [5 - [(4-methylpiperazino)methyl]-3-(phthalimidomethyl) - 4H - 1,2,4 - triazol-4-yl]benzophenone In the manner given in Example 8, a suspension of 2',5-dichloro-2 - [5-(chloromethyl) - 3 - (phthalimidomethyl)-4H-1,2,4-triazol - 4 - yl]benzophenone in tetrahydrofuran was treated with 4-methylpiperazine and then sodium iodide to give 2',5-dichloro-2 - [5 - [(4-methylpiperazino) methyl]-3-(phthalimidomethyl) - 4H - 1,2,4 - triazol-4-yl] benzophenone.

EXAMPLE 42

8-Chloro-1-[(4-methylpiperazino)methyl]-6-(o-chlorophenyl)-4H-s-triazolo[4,3-a][1,4]benzodiazepine In the manner given in Example 9, 2',5-dichloro-2-[5-(4-methylpiperazino)methyl] - 3 - (phthalimidomethyl)-4H-1,2,4-triazol-4-yl]benzophenone was refluxed in methanol with hydrazine hydrate to give 8-chloro-1-[(4-methylpiperazino)methyl]-6-(o-chlorophenyl) - 4H - s - triazolo-[4,3-a][1,4]benzodiazepine.

EXAMPLE 43

5-Chloro-2-[5-[(methylamino)methyl]-3-(phthalimidomethyl)-4H-1,2,4-triazol-4-yl]benzophenone In the manner given in Example 8, a suspension of 5 - chloro-2-[5-(chloromethyl)-3-(phthalimidomethyl)-4H-1,2,4-triazol-4 - yl]benzophenone in tetrahydrofuran was treated with a solution of methylamine in ether and then sodium iodide to give 5-chloro-2-[5-(methylamino) methyl]-3-(phthalimidomethyl)-4H-1,2,4-triazol - 4 - yl] benzophenone.

EXAMPLE 44

8-Chloro-1-[(methylamino)methyl]-6-phenyl-4H-s-triazolo[4,3-a][1,4]benzodiazepine In the manner given in Example 9, 5-chloro-2-[5-(methylamino)methyl] - 3 - (phthalimidomethyl)-4H-1,2,4-triazol-4-yl]benzophenone was refluxed in methanol with hydrazine hydrate to give 8-chloro-1-[(methylamino) methyl]-6-phenyl - 4H - s - triazolo[4,3-a][1,4]benzodiazepine.

The phthalimido compound III can also be prepared from the corresponding 3-amino-3,4-dihydro-4-hydroxy-4-phenylquinazoline, as shown in Example 45.

EXAMPLE 45

5-Chloro-2-[3-(phthalimidomethyl)-4H-1,2,4-triazol-4-yl]benzophenone

A stirred mixture of phthaloylglycine (4.52 g., 0.022 mole) and dry tetrahydrofuran (80 ml.) was cooled in an ice bath under nitrogen and treated with 3.56 g. (0.022 mole) of carbonyldiimidazole. The mixture was allowed to warm to ambient temperature and stand for 1.5 hours. It was then cooled in an ice bath and treated with 3-amino-6-chloro-3,4 - dihydro - 4 - hydroxy-4-phenylquinazoline (2.74 g., 0.01 mole) [M. E. Derieg et al., Tetrahedron Letters, 3869 (1970)]. The resulting mixture was stirred at room temperature for 18 hours and concentrated in vacuo. The residue was mixed with water, treated with a little sodium bicarbonate and extracted with chloroform. The extract was washed with water, dried over anhydrous sodium sulfate and concentrated. The crude residue was mixed with acetic acid (40 ml.), refluxed under nitrogen for 1 hour and concentrated in vacuo. The residue was mixed with water, neutralized with sodium bicarbonate and extracted with chloroform. The extract was washed with water, dried over anhydrous potassium carbonate and concentrated in vacuo. Crystallization of the residue from ethyl acetate gave 5-chloro-2-[3-(phthalimidomethyl)-4H-1,2,4-triazol-4-yl]-benzophenone.

In the manner given in the preceding examples, other 1-unsubstituted and substituted amino-6-phenyl-4H-s-triazolo[4,3-a][1,4]benzodiazepines of formulae VII or IX can be prepared. Representative compounds, thus prepared, include:

8-chloro-1-[(methylamino)methyl]-6-(o-chlorophenyl)-4H-s-triazolo[4,3-a][1,4]benzodiazepine;
7,8-dicyano-1-[(diisopropylamino)methyl]-6-(m-nitrophenyl)-4H-s-triazolo[4,3-a][1,4]benzodiazepine;
8-trifluoromethyl-1-[(dimethylamino)methyl]-6-(2,4-diethylphenyl)-4H-s-triazolo[4,3-a][1,4]benzodiazepine;
8-chloro-1-[(ethylamino)methyl]-6-(o-chlorophenyl)-4H-s-triazolo[4,3-a][1,4]benzodiazepine;
9-isopropyl-1-[(diethylamino)methyl]-6-(2,4-diethoxyphenyl)-4H-s-triazolo[4,3-a][1,4]benzodiazepine;
10-dimethylamino-1-[(dimethylamino)methyl]-6-(3-formamidophenyl)-4H-s-triazolo[4,3-a][1,4]benzodiazepine;
8-propylsulfinyl-7-methyl-1-(morpholinomethyl)-6-phenyl-4H-s-triazolo[4,3-a][1,4]benzodiazepine;
7,10-dibromo-1-(pyrrolidinomethyl)-6-(o-fluorophenyl)-4H-s-triazolo[4,3-a][1,4]benzodiazepine;
7,9-bis(methylthio)-1-(piperidinomethyl)-6-m-propylphenyl)-4H-s-triazolo[4,3-a][1,4]benzodiazepine;
8-methylsulfinyl-1-[(4-methylpiperazino)methyl]-6-phenyl-4H-s-triazolo[4,3-a][1,4]benzodiazepine;
9-nitro-6-fluoro-1-[(4-methylpiperazino)methyl]-6-phenyl-4H-s-triazolo[4,3-a][1,4]benzodiazepine;
8-chloro-1-[(4-phenylpiperazino)methyl]-6-phenyl-4H-s-triazolo[4,3-a][1,4]benzodiazepine;
7-propionamido-1-[(dimethylamino)methyl]-6-[p-propoxyphenyl]-4H-s-triazolo[4,3-a][1,4]benzodiazepine;
8-chloro-1-(pyrrolidinomethyl)-6-phenyl-4H-s-triazolo[4,3-a][1,4]benzodiazepine;
8-chloro-1-(piperidinomethyl)-6-phenyl-4H-s-triazolo[4,3-a][1,4]benzodiazepine;

and the like.

We claim:
1. A process for the production of 1-[(substituted amino)methyl] - 6 - phenyl-4H-s-triazolo[4,3-a][1,4]benzodiazepines of formula VII:

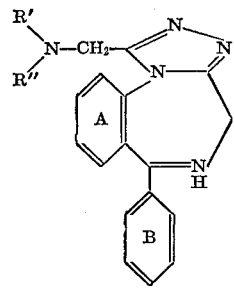

VII wherein R' is selected from the group consisting of hydrogen and alkyl of 1 to 3 carbon atoms, inclusive, wherein R" is alkyl as defined above, or, together

is pyrrolidino, piperidino, morpholino, 4-methyl- or 4-phenylpiperazino; and wherein the rings A and B are unsubstituted or substituted by one or two substituents selected from the group consisting of halogen, nitro, cyano, trifluoromethyl, and alkyl, alkoxy, alkylthio, alkylsulfinyl, alkylsulfonyl, alkanoylamino in which the carbon moiety is of 1 to 3 carbon atoms, inclusive, and dialkylamino in which the alkyl group is defined as above, which comprises the steps:

(1) heating to a temperature of 100–150° C. a mixture of a 2-(4H-1,2,4-triazol-4-yl)benzophenone of the formula I

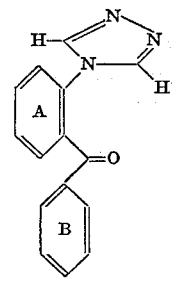

I wherein A and B have the significance of above, with formaldehyde to obtain the corresponding 2-[3-(hydroxymethyl)-4H-1,2,4-triazol-4-yl]benzophenone of formula II

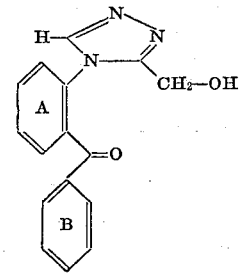

II wherein A and B have the significance of above;

(2) treating II with phthalimide, triphenylphosphine and diethyl azodicarboxylate for 2–36 hours at between 0–40° C. to obtain the corresponding 2-[3-(phthalimidomethyl)-4H-1,2,4-triazol - 4 - yl]benzophenone of formula III

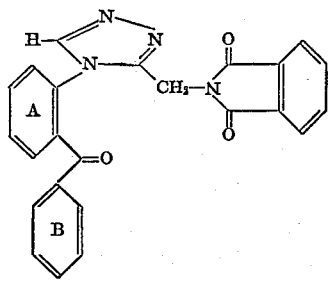

III wherein A and B have the significance of above;

(3) treating III with formaldehyde at 100 to 150° C. to obtain the corresponding 2-[3-(phthalimidomethyl)-5-(hydroxymethyl) - 4H-1,2,4-triazol-4-yl]benzophenone of the formula IV:

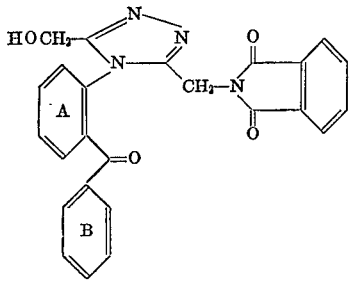

wherein A and B have the significance of above;

(4) treating IV with a halogenating agent selected from thionyl chloride and phosphorus tribromide to obtain the corresponding 2-[3-(phthaliminomethyl)-5-(halomethyl)-4H-1,2,4 - triazol - 4 - yl]benzophenone of formula V:

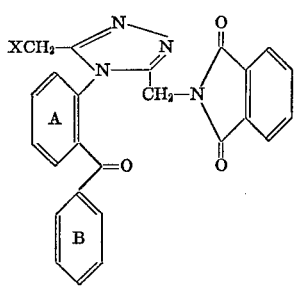

wherein A and B have the significance of above, and wherein X is chloro or bromo;

(5) treating V with an amine of the formula

wherein R' is alkyl defined as above, or hydrogen, wherein R" is alkyl defined as above or together

is pyrrolidino, piperidino, morpholino, 4-methyl- or 4-phenylpiperazino, in the presence of an alkali iodide, to give the corresponding 2-[5-[(substituted amino)methyl] - 3 - (phthalimidomethyl)-4H-1,2,4-triazol-4-yl]benzophenone VI:

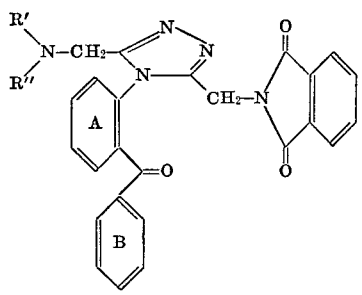

wherein R', R", A and B have the significance as defined above; and (6) heating VI with hydrazine hydrate to give the compound of formula VII above.

2. The process of claim 1 wherein the starting material is 5-chloro-2-(4H-1,2,4-triozol-4-yl)benzophenone.

3. The process of claim 1 wherein the starting material is 2',5-dichloro-2-(4H-1,2,4-triazol-4-yl)benzophenone.

4. The process of claim 1 wherein the formaldehyde used in steps 1 and 3 is paraformaldehyde.

5. The process of claim 1 wherein in step 4 the halogenating agent is thionyl chloride and the reaction temperature is 78° to 83° C.

6. The process of claim 1 wherein the step 4 phosphorus tribromide in an organic solvent, from the group consisting of methylene chloride, chloroform, carbontetrachloride and tetrahydrofuran, is used at a temperature of 0–10° C. for 10–90 minutes and thereafter between 20–40° C. for 1 to 24 hours.

7. The process of claim 1 wherein the amine in step 5 is a dialkylamine in which the alkyl group is of 1 to 3 carbon atoms, inclusive.

8. The process of claim 1 wherein the amine used in step 5 is a monoalkylamine in which the alkyl group is of 1 to 3 carbon atoms, inclusive.

9. The process of claim 1 wherein the amine in step 5 is selected from the group consisting of pyrrolidine, piperidine, morpholine, 4-methylpiperazine, and 4-phenylpiperazine.

10. A process for the production of a 1-aminomethyl-6-phenyl-4H-s-triazolo[4,3-a][1,4]benzodiazepine of the formula IX

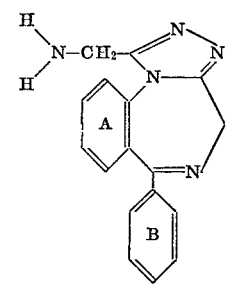

wherein the rings A and B are unsubstituted or substituted by one or two substituents selected from the group consisting of halogen, nitro, cyano, trifluoromethyl, and alkyl, alkoxy, alkylthio, alkylsulfinyl, alkylsulfonyl, alkanoylamino in which the carbon moiety is of 1 to 3 carbon atoms, inclusive, and dialkylamino in which the alkyl group is of 1 to 3 carbon atoms, inclusive, which comprises:

(1) heating to a temperature of 100-150° C. a mixture of 2 - (4H - 1,2,4-triazol-4-yl)benzophenone of the formula I

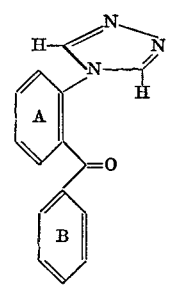

wherein A and B have the significance of above, with formaldehyde to obtain the corresponding 2-

[3 - (hydroxymethyl) - 4H-1,2,4-triazol-4-yl]benzophenone of formula II:

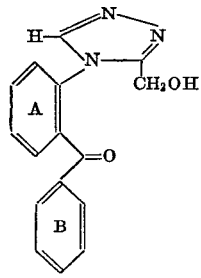

II wherein A and B have the significance of above;
(2) treating II with phthalimide, triphenylphosphine and diethyl azodicarboxylate for 2-36 hours at between 0-40° C. to obtain the corresponding 2-[3-(phthalimidomethyl) - 4H - 1,2,4-triazol-4-yl]benzophenone of the formula III:

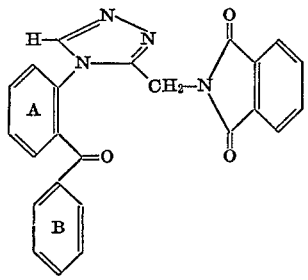

III wherein A and B have the significance of above;
(3) treating III with formaldehyde at 100 to 150° C. to obtain the corresponding 2 - [3 - (phthalimidomethyl)-5-(hydroxymethyl) - 4H-1,2,4-triazol-4-yl] benzophenone of the formula IV:

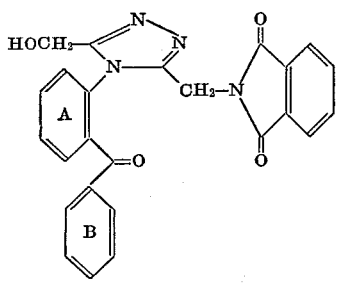

IV wherein A and B have the significance of above;
(4) treating IV with a halogenating agent selected from thionyl chloride and phosphorus tribromide to obtain the corresponding 2-[3-(phthalimidomethyl)-5 - (halomethyl)-4H-1,2,4-triazol-4-yl]benzophenone of formula V:

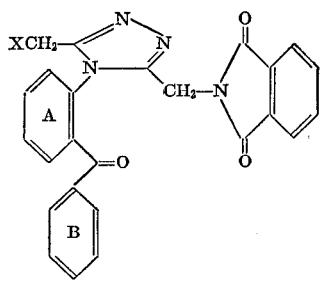

V wherein A and B have the significance of above; and wherein X is chloro or bromo;
(5) treating V with ammonia gas in methanol to give the corresponding 1-[(phthalimido)methyl]-6-phenyl-4H-s-triazolo [4,3-a][1,4]benzodiazepine of formula VIII:

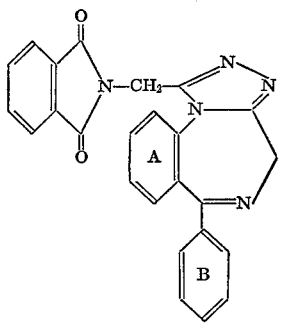

VIII wherein A and B have the significance of above; and
(6) treating VIII with hydrazine hydrate in a lower alkanol of 1 to 3 carbon atoms, at reflux temperature to obtain the product of formula IX above.

11. The process of claim 10 wherein the lower alkanol is ethanol.

References Cited

UNITED STATES PATENTS 3,709,898  1/1973  Hester _____ 260—308 R

ALTON D. ROLLINS, Primary Examiner

U.S. Cl. X.R.

260—247.2 A, 247.5 E, 268 TR, 293.59, 308 R; 424—248, 250, 267, 269.

Page 1 of 3

UNITED STATES PATENT AND TRADEMARK OFFICE
CERTIFICATE OF CORRECTION

PATENT NO. : 3,842,090
DATED : October 15, 1974
INVENTOR(S) : Martin Gall and Jackson B. Hester, Jr.

It is certified that error appears in the above-identified patent and that said Letters Patent are hereby corrected as shown below:

Column 1, line 15-25: Formula X should appear as shown below instead of as in the patent:

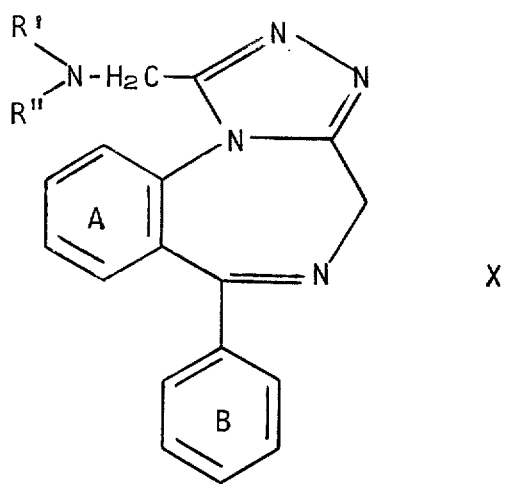

Column 3, line 50-55: " V " should read -- V --

Column 7, line 4, "[4,3][2,4]" should read -- [4,3-a][2,4] --; line 36, "[dimethylamino" should read -- [(dimethylamino --; line 65, "$ED_{30}$" should read -- $ED_{50}$ --. Column 8, line 21, "$LD_5$" should read -- $LD_{50}$ --. Column 9, line 48, "6-8 hours" should read -- 2-8 hours --. Column 10, line 43, "ethanol" should read -- methanol --. Column 11, line 30, "[5-chloro-" should read -- [5-(chloro- --; line 58, "methyl-4H-" should read -- methyl)-4H- --. Column 12, line 11, "methyl]-3-" should read

UNITED STATES PATENT AND TRADEMARK OFFICE
CERTIFICATE OF CORRECTION

PATENT NO. : 3,842,090
DATED : October 15, 1974
INVENTOR(S) : Martin Gall and Jackson B. Hester, Jr.

It is certified that error appears in the above-identified patent and that said Letters Patent are hereby corrected as shown below:

-- methyl-3- --; line 11, "triazolyl" should read -- triazol --; line 18, "triazolyl" should read -- triazol --; line 34, "[4,3-a[1,4]" should read -- [4,3-a][1,4] --; line 56, "[1,4-]" should read -- [1,4] --; line 75, "(VII)" should read -- (XII) --. Column 13, line 25-35: Formula XII should appear as shown below instead of as in the patent:

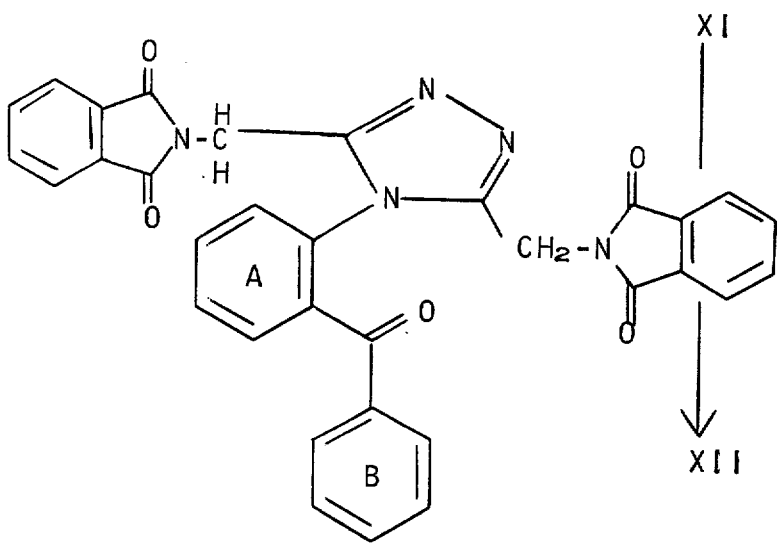

UNITED STATES PATENT AND TRADEMARK OFFICE
CERTIFICATE OF CORRECTION

PATENT NO. : 3,842,090

DATED : October 15, 1974

INVENTOR(S) : Martin Gall and Jackson B. Hester, Jr.

It is certified that error appears in the above-identified patent and that said Letters Patent are hereby corrected as shown below:

Column 14, line 3, "was stirred" should read -- and stirred --; line 13, "(0.1 mol.)" should read -- (0.1 ml.) -- ; line 54, "[5-hydroxy" should read -- [5-(hydroxy --. Column 15, line 19, "[3-hydroxy" should read -- [3-(hydroxy --; line 60/61, "difluorophenyl(-" should read -- difluorophenyl)- --. Column 16, line 12, "-4yl]" should read -- -4-yl]- --; line 70, "2-[3-hydroxy" should read -- 2-[3-(hydroxy --. Column 17, line 26, "[5-pyr-" should read -- [5-(pyr- --; line 57/58, "(phthalimido)-methyl-" should read -- (phthalimidomethyl)- --; line 58, "triazole" should read -- triazol --. Column 18, line 31, "dihcoloro" should read -- dichloro --. Column 19, line 39, "-6-m-" should read -- 6-(m- --.

Signed and Sealed this

Third Day of August 1976

[SEAL]

Attest:

RUTH C. MASON
*Attesting Officer*

C. MARSHALL DANN
*Commissioner of Patents and Trademarks*